US009721421B2

(12) United States Patent
Blazevic

(10) Patent No.: US 9,721,421 B2
(45) Date of Patent: Aug. 1, 2017

(54) ELECTRONIC GAMING SYSTEM WITH PHYSICAL GAMING CHIPS AND WAGER DISPLAY

(71) Applicant: Mladen Blazevic, New York, NY (US)

(72) Inventor: Mladen Blazevic, New York, NY (US)

( * ) Notice: Subject to any disclaimer, the term of this patent is extended or adjusted under 35 U.S.C. 154(b) by 196 days.

(21) Appl. No.: 14/703,887

(22) Filed: May 5, 2015

(65) Prior Publication Data

US 2016/0328913 A1 Nov. 10, 2016

(51) Int. Cl.
*G06F 17/00* (2006.01)
*G07F 17/32* (2006.01)

(52) U.S. Cl.
CPC ........ *G07F 17/3211* (2013.01); *G07F 17/322* (2013.01); *G07F 17/3248* (2013.01)

(58) Field of Classification Search
USPC ...................................................... 463/16–25
See application file for complete search history.

(56) References Cited

U.S. PATENT DOCUMENTS

| | | | | |
|---|---|---|---|---|
| 6,676,517 | B2 * | 1/2004 | Beavers | G06Q 50/34 463/25 |
| 6,688,979 | B2 | 2/2004 | Soltys et al. | |
| 6,712,696 | B2 | 3/2004 | Soltys et al. | |
| 6,758,751 | B2 | 7/2004 | Soltys et al. | |
| 6,857,961 | B2 | 2/2005 | Soltys et al. | |
| 6,964,612 | B2 | 11/2005 | Soltys et al. | |
| D512,466 | S | 12/2005 | White et al. | |
| 6,991,544 | B2 | 1/2006 | Soltys et al. | |
| 7,011,309 | B2 | 3/2006 | Soltys et al. | |
| 7,222,852 | B2 | 5/2007 | Soltys et al. | |
| 7,317,615 | B2 | 1/2008 | Chrysler et al. | |
| 7,390,256 | B2 | 6/2008 | Soltys et al. | |
| 7,427,234 | B2 | 9/2008 | Soltys et al. | |
| 7,510,194 | B2 | 3/2009 | Soltys et al. | |
| 7,575,234 | B2 | 8/2009 | Soltys et al. | |
| 7,758,411 | B2 | 7/2010 | Crawford et al. | |
| 8,147,316 | B2 | 4/2012 | Loose et al. | |
| 8,348,747 | B2 | 1/2013 | Loose et al. | |
| 8,480,261 | B2 | 7/2013 | Maul et al. | |
| 8,926,421 | B2 | 1/2015 | Loose et al. | |
| 8,969,802 | B1 | 3/2015 | Blazevic | |
| 2002/0187821 | A1 | 12/2002 | Soltys et al. | |

(Continued)

OTHER PUBLICATIONS

Blazevic, U.S. Appl. Serial No. 14/668,980, filed Mar. 25, 2015.

*Primary Examiner* — Ronald Laneau
(74) *Attorney, Agent, or Firm* — Mark A. Litman & Associates, P.A.

(57) ABSTRACT

A table system assists in determining wagering events. The system has a gaming surface; at least one player position on the gaming surface; and at least one area is designated at the at least one player position for placement of wagers in the form of chips. A scale is positioned beneath the at least one area configured to provide electrical signals indicating weight placed in the at least one designated area. A processor is configured to receive the electrical signals and execute code to identify numbers of chips placed in the at least one designated area. The processor is further configured to provide signals indicating the identified number of chips to a display on the gaming table surface at the player position. The display is configured to provide a visual indication of at least the number of chips or the value of chips.

12 Claims, 3 Drawing Sheets

(56) References Cited

U.S. PATENT DOCUMENTS

| | | | | |
|---|---|---|---|---|
| 2002/0198052 | A1 | 12/2002 | Soltys et al. | |
| 2003/0087696 | A1 | 5/2003 | Soltys et al. | |
| 2003/0173737 | A1 | 9/2003 | Soltys et al. | |
| 2003/0176209 | A1 | 9/2003 | Soltys et al. | |
| 2004/0087362 | A1* | 5/2004 | Beavers | B60B 27/00 463/25 |
| 2004/0147327 | A1 | 7/2004 | Soltys et al. | |
| 2004/0207156 | A1 | 10/2004 | Soltys et al. | |
| 2004/0219975 | A1 | 11/2004 | Soltys et al. | |
| 2006/0001217 | A1 | 1/2006 | Soltys et al. | |
| 2006/0058088 | A1 | 3/2006 | Crawford et al. | |
| 2006/0121975 | A1 | 6/2006 | Soltys et al. | |
| 2006/0128472 | A1* | 6/2006 | Beavers | G06Q 50/34 463/42 |
| 2006/0189365 | A1 | 8/2006 | Crawford et al. | |
| 2010/0130280 | A1 | 5/2010 | Arezina et al. | |
| 2011/0052049 | A1* | 3/2011 | Rajaraman | G06Q 10/087 382/165 |
| 2011/0275432 | A1 | 11/2011 | Lutnick et al. | |
| 2012/0157193 | A1 | 6/2012 | Arezina et al. | |
| 2012/0281198 | A1 | 11/2012 | Maul et al. | |
| 2014/0347471 | A1 | 11/2014 | Blazevic | |
| 2014/0349726 | A1 | 11/2014 | Buchholz | |
| 2014/0370980 | A1 | 12/2014 | Czyzewski et al. | |
| 2015/0087417 | A1 | 3/2015 | George et al. | |

* cited by examiner

ELECTRONIC GAMING SYSTEM WITH PHYSICAL GAMING CHIPS AND WAGER DISPLAY

BACKGROUND OF THE INVENTION

1. Field of the Invention

The present technology relates to the field of gaming and particularly table gaming, and table gaming systems in which physical wagering elements are placed on the gaming table and a degree of wager values determined.

2. Background of the Art

Tables are often used in casinos to provide wagering games around which multiple players engage in a common wagering event. Typical table wagering events include craps, roulette, blackjack, baccarat and poker variants (e.g., Three-Card Poker™ game, Four-Card Poker™ game, Pai Gow poker, and the like). There can be a significant training period for casino personnel to enable them to play various table games. In many of these games, the dealer physical counts wagers, consults a paytable and physical distributes winnings and/or collects wagers without significant supervision. This control exercised by the dealers can lead to errors in payments or collection of losses, and in some instances has allowed collusion between players and a dealer in which the casino is defrauded. Collusion may be implemented in intentional error in evaluating event outcomes (e.g., rank of hands) or is misreading relative ranks in player versus dealer competitions. Dealers may later claim unintentional error in overpayments or insufficient collection of wagers.

Numerous efforts have been made to provide more automated table gaming systems. It has been thought that by automating delivery of random events (e.g., virtual playing cards, virtual roulette outcomes, virtual dice casting and the like) and allowing for wagering of electronically accounted credits would eliminate fraud and collusion and also reduce personnel at the casino by eliminating dealers and pit bosses and croupier.

The elimination of physical gaming elements (e.g., playing cards and chips and dealers) significantly alters the ambiance of the gaming environment and other aspects of the environment such as player interaction. For example, dealers can add to the comfort of players and provide a more social feel to the gaming environment. Even with people of an age where electronic interaction is the norm, there is greater comfort with a live dealer.

Many variations in degrees of electronic game table control have been attempted. The following identifies some of the significant efforts in providing electronic controls in a table gaming system.

U.S. Pat. Nos. 8,926,421; 8,348,747; 8,147,316; and 7,758,411 and Published Applications Nos. 20060189365 (PokerTek) describe fully electronic tables with virtual playing cards, electronic wagering and even no live dealer. Multiple players have individual active screens displaying event outcomes and enabling wagers. U.S. Design Pat. D512,466 shows a table layout with individual player panels that display individual player cards and provide individual player inputs on wagers and discards.

Published US Patent Application Documents Nos. 20120157193 and 20100130280 (Arezina) describe a multi-player gaming system that senses multiple simultaneous contacts on a surface of a gaming table, differentiating contacts by different players. Privacy controls selectively display private information visible to only one of the players on or near the display surface of the gaming table. The gaming system also detects physical objects placed on the surface of the gaming table, causing wagering game functions or peripheral functions to be performed as a result of the placement of the object on the display surface.

Other systems emphasize control of playing cards and reading playing card and hand ranks. Published US Patent Application Documents No. 20100019449 (Downs) describes a playing card delivery shoe is used in the play of the casino table card game of baccarat or blackjack or any game where cards are pulled one at a time from the shoe. The apparatus comprises a reader or an imager that scans lines bisecting the image at spaced intervals. The scanning occurs on playing cards in at least the region where suit and rank symbols are provided. The scanner output is a series of voltages that are converted to binary information. This binary information is compared to stored binary information to determine rank and suit. The upper surface of the output end of the shoe contains a partial barrier for cards being scanned. The partial barrier has an elevated surface and limits a size of a pathway so that only one card can be removed at a time. The system may also include a second identification device associated with a second player; a contact sensing device adjacent to the display surface, the contact sensing device detecting first contact data when the first player moves a wager asset across the display surface during the wagering game and associating the first contact data with the first player, the contact sensing device detecting second contact data when the second player subsequently moves the wager asset across the display surface during the wagering game and associating the second contact data with the second player. The system may also determine a transfer of a value of the wager asset from the first player to the second player based on the first and second contact data; and adjust, during the wagering game, credit balances of the first player and the second player to reflect the determined transfer of value. Other aspects and implementations relate to a wagering game system including a multiplayer, multi-touch table on which physical objects can be placed causing wagering game functions or peripheral functions to be performed as a result of the placement of the object, its location or orientation, its shape, its weight, or other characteristics. The physical object may be a player tracking device carried by the player and placed on the wagering game table. The table surface defines a number of regions such that when the player tracking card is placed in a predefined region, a predetermined function is carried out. If the card is placed in a region defined for transferring funds, credits or wagers can be transferred between the card and the table. If the card or object is placed in a region defined for manipulating a virtual camera, turning the object will manipulate the orientation angle of a virtual camera depicting a wagering game image. The physical object may be a blank roulette wheel with unnumbered pockets, whose numbers are projected onto the spinning wheel by a downward-facing projector system that captures the wheel's rotational speed and ball position to create video images that change with the spinning wheel.

Published US Patent Application Documents No. 20110275432 (Lutnick) describes an apparatus comprising: a machine readable medium having stored thereon a plurality of instructions that when executed causes a computing device to perform a method comprising: receiving a first wager by a first player on an outcome of a first poker game; determining a first set of hold cards for the first poker game; presenting the first set of hold cards to the first player; receiving a second wager by the first player on only the flop of the first poker game, in which the second wager may be won and lost independently of the first wager, in which the second wager includes a wager that the flop will include at least one characteristic; determining the flop of the first poker game; presenting the flop to the first player; determining whether the second wager is a winning wager based on whether the flop includes the characteristic; presenting an indication of whether the second wager is a winning wager; determining whether the first wager is a winning wager; and presenting an indication of whether the first wager is a winning wager. A software application may use an API associated with a pressure sensor to retrieve data from the sensor, e.g., data about the weight of chips placed over the sensor.

Published US Patent Application Documents No. 20150087417 (George) describes a system for use in operating gaming tables within a gaming environment is described herein. The system includes a user computing device including a display device, an imaging device for capturing and transmitting video images of an observation area within the gaming environment, and a system controller coupled to the user computing device and the imaging device. The system controller is configured to receive a live video image including a gaming table, display the live video image within a display area on the display device, and display an event area within the display area overlaying a portion of the gaming table image. The system controller detects a triggering condition associated with the event area and responsively generates an event record. The triggering condition includes a change in an image characteristic within the event area. The event record is indicative of game play at the gaming table. The system includes a bet sensor for sensing values of multiple gaming tokens as a bet placement surface configured and oriented to support a stack of gaming tokens thereon; an image sensor located and oriented to capture an image of a lateral side surface of at least one gaming token located on the bet placement surface, wherein the image depicting the lateral side surface is in a radial format; and a processor in communication with the image sensor, the processor configured to acquire image data from the image and analyze the image data to determine a wager value of the at least one token.

Published US Patent Application Document No. 20140370980 (Czyzewski) describes a gaming assemblies with a playing surface including at least one screen display. A system projects visual light on the screen display. A radiation source illuminates objects placed over the screen display. A radiation sensor senses at least a portion of the objects placed over the screen display. A control circuit utilizes data from the radiation sensor. Methods of operating gaming tables and wagering game systems may include such gaming assemblies. A method of operating the gaming table, includes: projecting with a system an image onto a rear side of a screen display positioned proximate a playing surface of a gaming table to enable viewing of the image on a front side of the screen display; illuminating the rear side of the screen display with radiation from a radiation source located at the rear side of the screen display, wherein the screen display is at least partially translucent to the radiation to enable at least a portion of the radiation to reflect from an object placed proximate the front side of the screen display; receiving the at least a portion of reflected radiation at a radiation sensor; generating digital data corresponding to the portion of reflected radiation received at the radiation sensor; and determining that the object is present on the top side of the screen with a control circuit configured to receive the digital data.

Published US Patent Application Document No. 20140349726 (Bucholz) describes a method for presenting the appearance of altered game outcome. In some embodiments, the operations can include presenting, by an electronic wagering game table, a wagering game including a game piece. The operations can also include determining a result for the wagering game. The operations can also include receiving first player input to move the game piece to reveal the result. The operations can also include presenting, on a display device, movement of the game piece. The operations can also include receiving, by the electronic wagering game table, second player input to alter the movement of the game piece, wherein alteration of the movement of the game piece appears to modify the result for the wagering game. The operations can also include presenting, in response to the second player input, altered movement of the game piece and the result for the wagering game.

A series of U.S. patents with a common inventor of Soltys (including by way of non-limiting examples, U.S. Pat. Nos. 7,575,234; 7,510,194; 7,427,234; 7,390,256; 7,317,615; 7,222,852; 7,011,309; 6,991,544; 6,964,612; 6,857,961; 6,758,751; 6,712,696; and 6,688,979) describes various components and methods attempting to configure and establish a more automated gaming table.

U.S. Pat. No. 8,969,802, U.S. patent application Ser. No. 14/668,980 filed 25 Mar. 2015 (Blazevic) enables a method of reading suit and rank of playing cards on a system for controlled provision of image content of faces of a playing card that has: e) a support surface for playing cards; f) a source of infrared radiation; g) an infrared sensitive camera; and h) a processor. The infrared sensitive camera positioned to capture infrared radiation transmitted through the playing cards and transmit information based on the captured radiation to the processor; and the processor configured to provide suit and rank information of a playing card through which the infrared radiation was transmitted.

Published US Patent Application Document No. 20140347471 (Blazevic) enables methods and systems detect markings or flaws on the backs of playing cards. The method includes: providing ambient radiation at a gaming table and reflecting some of that radiation off a back surface of a playing card; capturing reflected radiation with a radiation sensor; the radiation sensor transmitting signals based on the reflected radiation captured by the radiation sensor; the transmitted signals providing data that contains image data of the back of the playing card; and displaying an image of the back of the playing card based on the image data. The transmitted signals provide image data of the back of the playing card and are also received by a processor that evaluates or compares that data. The system may be an installed casino system (with eye-in-the-sky technology), a portable box, or a component within a shuffling device or dealer shoe. This technology may be incorporated into the table systems of the present technology at various positions.

All documents cited herein are incorporated by reference in their entirety.

SUMMARY OF THE INVENTION

A table system assists in determining wagering events. The system has a gaming surface; at least one player position on the gaming surface; and at least one area is designated at the at least one player position for placement of wagers in the form of chips. A scale is positioned beneath the at least one area configured to provide electrical signals indicating weight placed in the at least one designated area. A processor is configured to receive the electrical signals and execute code to identify numbers of chips placed in the at least one designated area. The processor is further configured to provide signals indicating the identified number of chips to a display on the gaming table surface at the player position. The display is configured to provide a visual indication of at least the number of chips or the value of chips.

DETAILED DESCRIPTION OF THE INVENTION

Figure 1:
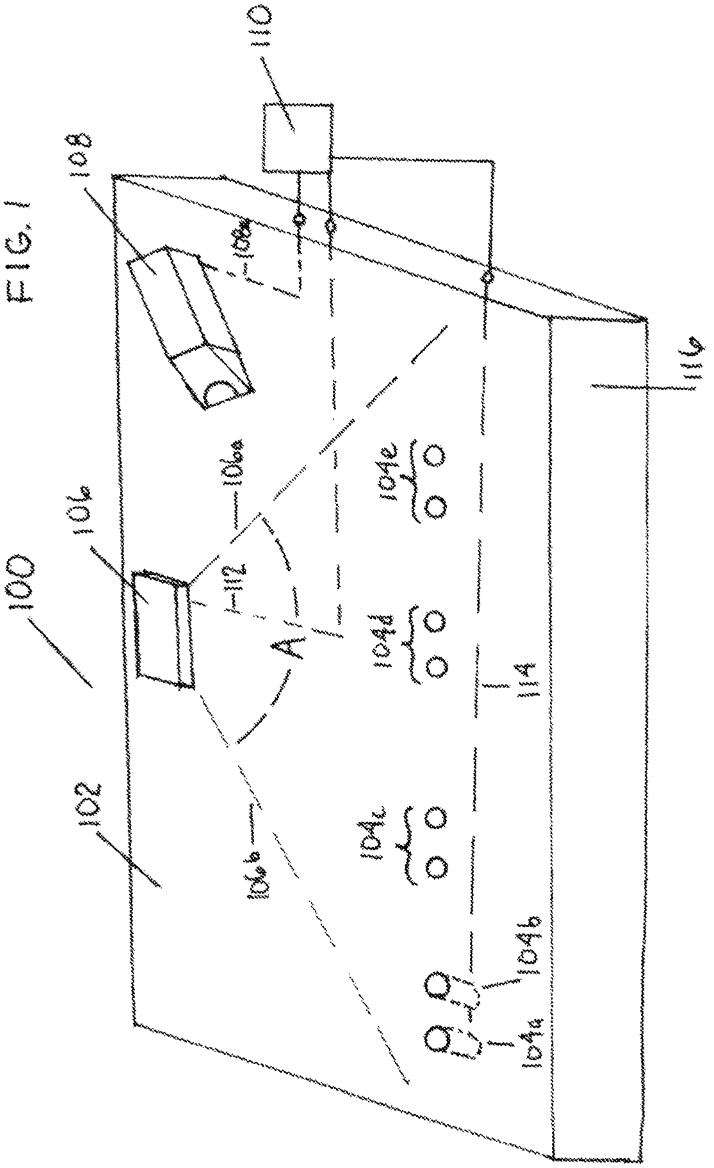
FIG. 1 is a perspective view of a gaming table within the scope of the present technology.

A table system assists in determining wagering events. The system has a gaming surface; at least one player position on the gaming surface; and at least one area is designated at the at least one player position for placement of wagers in the form of chips. A scale is positioned beneath the at least one area configured to provide electrical signals indicating weight placed in the at least one designated area. A processor is configured to receive the electrical signals and execute code to identify numbers of chips placed in the at least one designated area. The processor is further configured to provide signals indicating the identified number of chips to a display on the gaming table surface at the player position. The display is configured to provide a visual indication of at least the number of chips or the value of chips.

The table system may further have an electronic camera having an image capture area that include the at least one designated area. There may be a single camera for each player position or a single camera may sweep multiple areas. The camera sweeping multiple areas may have a pre-programmed autofocus when the lens of the camera is directed towards each respective designated area for wagers. There may also be multiple designated areas at each player position. The chips may be standard chips, with the camera and processor function enabling color differentiation between chips (e.g., orange side component for $1,000, purple for $500, black for $100, green for $25, read for $5 and white for $1. The chips may have in addition to or in place of the typical color identification, special markings on sides of the chips which can be read by the camera to identify value of chips. The processor will compare weight measurements at each designated area and compare the image content for number (and type/value) of chips at each designated area to provide confirmation that the weighed number of chips is accounted for in the valuation of wagers by the processor. For example, if six chips are weighed, six chips must be valued. If fewer than six chips or a greater number than six chips are indicated by the camera at a designated wagering position (an unlikely occurrence), the camera or cameras will rescan the designated wagering position. If a discrepancy remains, and if there are multiple cameras, a second camera can be configured to scan the disputed count and value at a designated wagering position.

The table system may have the electronic camera configured to send image data captured from the at least one designated area to the processor. The processor, as noted above, can be configured to discriminate along lines of separation of chips, colors or chips and any special markings or non-visible (infrared or ultraviolet) markings on sides of the chips. The discrimination would be used in the determination of numbers and values of collective and individual chips. For example, the camera(s) is configured to send captured image data differentiating values of individual chips in the designated area, and/or the processor is configured to determine total values of all chips in the designated area using at least sent captured image data. The processor is configured to determine total values of all chips in the designated area using at least sent captured image data and received electrical signals from the scale. The table system may have the display include a light display indicating numbers of chips by length, and/or area of illumination of the light display. Alternatively, the display may include a light display indicating numbers of chips by display of alphanumerics indicating the number or value of chips.

The table system may have the camera oriented towards or adjustably oriented at (motorized or manual, preferably automated by direction through the processor and/or a management viewing system of the captured image of the camera) the designated (wagering) area at an angle between parallel to the gaming surface and downward forty-five (or more) or thirty degrees towards the gaming surface.

The table system may have the camera be sensitive to visible radiation as well as including at least some radiation outside the visible spectrum (infrared and/or ultraviolet) and a source of radiation outside the visible spectrum to which the camera is sensitive illuminates the designated area.

The determination of the value and/or number of chips may be referred to herein as the "calculation." The method of making the calculation visible is referred to as the "display." The following description assists in appreciating the display of the calculation.

Among the formats in which the display of the calculation is represented by length or area are:

1) Linear arrays of bulbs, such as LED bulbs, which may also include differing colors of lights. The length of a line of bulbs may be a literal count of chips. The colors of the bulbs may also indicate value (e.g., white bulbs for $5, green bulbs for $25, red bulbs for $100 and blue bulbs for $500. Thus, a line of 20 bulbs may enable identification of any wagered amount (I $5 increments) up to $2,500, which might be the table limit.
2) Area displays of bulbs or a LCD screen covering an area. The area may be an array of lines or concentric circles or defined areas, preferably adjacent the wagering area. The concentric circles may be in colors and partially lit to indicate the numbers of chips of particular denominations that have been wagered, as with circles having five segments (rather than just five bulbs) in each circle. The various segments may also vary in intensity to indicate the increasing number and size of wagered chips of each denomination. That is, the first wagered red chip may cause a first segment to emit 10 lumens, the second red chip may cause the second segment to emit at 20 lumens, etc. The segments may also revolve in the respective color circles, with the speed of rotation varying to show increasing numbers or denominations of chips wagered.
3) The linear arrays or areas may also be adjacent a printed scale with scholastic values, literal values, or imagery indicating relative size of the wagers (e.g., a guppy for a small wager, progressing up to an image of a whale for the largest wagers).

4) A literal display of the literal numeric size of the wager can be displayed (e.g., on an LCD display), preferably in a manner that can be viewed by both player and dealer (e.g., a two way screen with a frontal and obverse view, one facing the dealer the other facing the player.

5) There may be a monitor in the vicinity of the gaming table that shows numbers of chips, values of chips and/or total value of all chips, either in literal images of the chips, or other representations conveying the number and value of the wagers. Other representations as much about entertainment value, attraction value for other casino visitors, as well as for literal display of wagers. In an entertainment aspect, a small wager may be a small animal and the largest wager a largest animal. With a light as the size of the wager indicator, a tower or image of a building may be progressively lit up and a fireworks or star-topped light on the building may be lit to show that a maximum or near maximum wager was placed.

6) The display may be in non-visible wavelengths so that only automated equipment (casino controlled security cameras sensing IR or UV radiation) can determine the wager size.

The lights are preferably provided on the table so as to not to interfere with playing card and chip movement. One easy way of implementing this benefit is to have the radiation emitters (especially the visible radiation emitting color LED bulbs) flush with or under a relatively flat surface. When flush with the surface the uppermost portion of the LED bulb would have a flat surface flush with the table surface, or would have a cap that fits or nestles into the surface to form a flush seal. Alternatively, the table top may be a translucent or transparent flat table surface and the radiation emitters beneath the flat table surface, emitting the processor-controlled image/light/pattern/linear display/concentric circle display and the like.

An alternative description of technology within the generic scope of the present technology is a table system for assisting in determination of wagering events comprising:

a gaming surface; at least one player position on the gaming surface; at least one area designated at the at least one player position for placement of wagers in the form of chips; a scale positioned beneath the at least one area configured to provide electrical signals indicating weight placed in the at least one designated area; a processor configured to receive the electrical signals and execute code to identify numbers of chips placed in the at least one designated area; an electronic camera having an image capture area that include the at least one designated area and receive and transmit image data received from the at least one designated area regarding wagering value of individual chips within the at least one designated area; the processor configured to provide signals indicating at least one of total number of the chips placed in the at least one designated area or the value of the chips placed in the at least one designated area; and a display system on the gaming table displaying at least one of total number of the chips placed in the at least one designated area or the value of the chips placed in the at least one designated area.

The descriptions of individual and collective limitations of this system are substantially the same as in the system described earlier.

The display system may be fixed in or under the table surface (with a translucent or transparent surface over the lights) and the display indicia do not include alphanumeric symbols, with value of chips in the designated area indicated by numbers of lights or areas of lights. The numbers of lights may indicate exact numbers of chips wagered. The different colors of lights indicate different values of chips in the designated area.

FIG. 1 is a perspective view of a gaming table 100 within the scope of the present technology. The gaming table 100 has a top surface 102. A perspective view of a first player position scale for sensing wagers 104*a* 104*b* and the tops only of three other pairs of player position scales 104*c*, 104*d* and 104*e* are shown. A communication link 114 from the first player position scales 104*a*, 104*b* are shown extending outside of the table base 116 to a processor 110. Also shown are an above-table camera 106 having a field of view A than includes a scan range between 106*a*-106*b* covering all of the wagering positions 104*a-e* on the gaming table surface 102. There is a communication link 112 between the camera 106 and the processor 110. A card delivery system 108, which is not essential to, but may be integrated into the system of the invention, is shown with its communication link 108*a* to the processor 110. The card delivery system 108 may be a shuffler, randomizer or card delivery shoe, preferably a card reading device that can transmit knowledge of card suits and rank to the processor 110.

Figure 2:
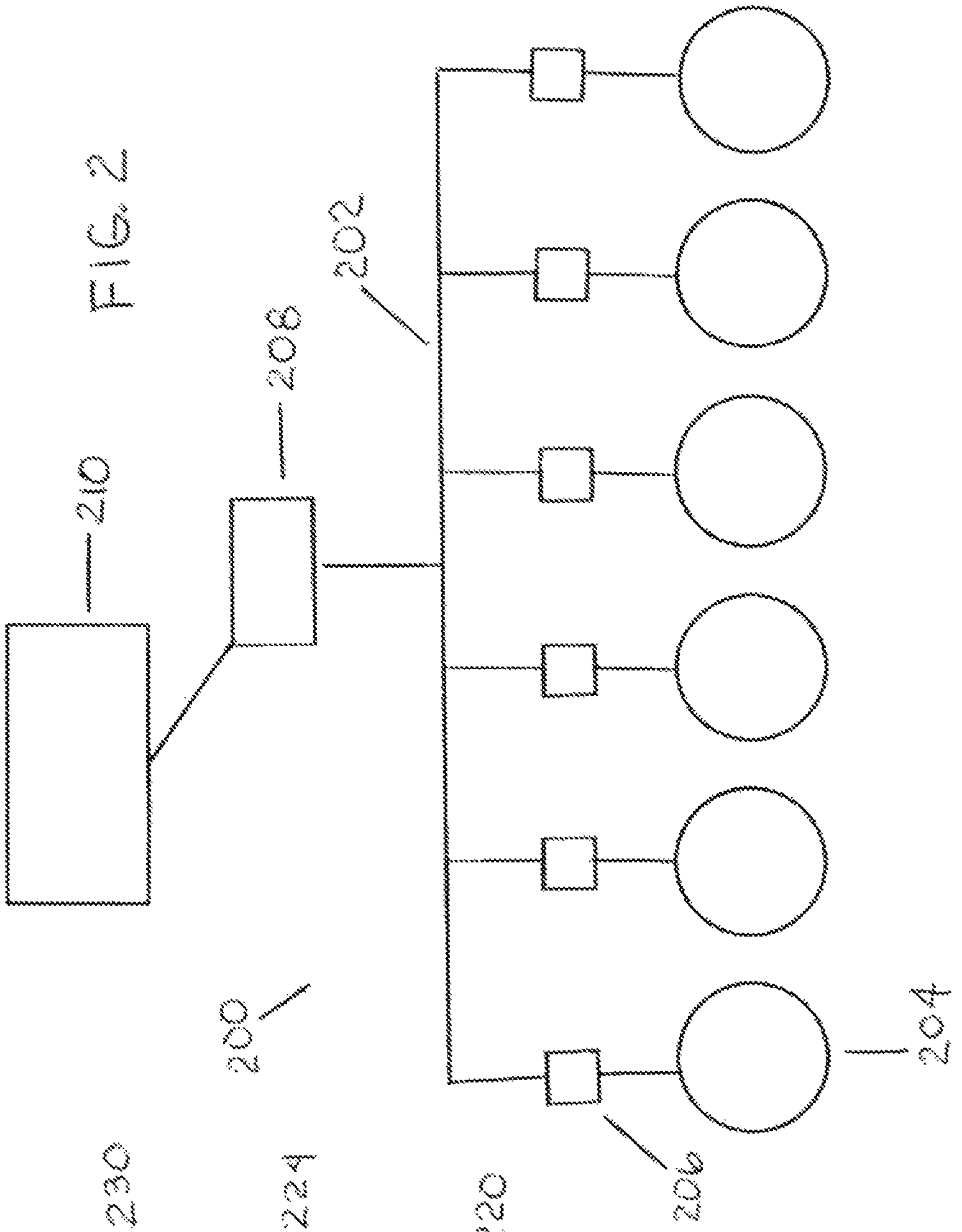
FIG. 2 is a schematic of a top view of electronic distributions within a gaming table within the scope of the present technology.

FIG. 2 is a schematic of a top view of electronic distributions within a gaming table 200 within the scope of the present technology. Six electronic scales 204 in communication with six separate load cell sensor amplifiers (LCSA) 206 The six LCSAs have a communication link 202 to a processor (data acquisition module) 208. The Module 208 transmits the processed signals from the scales 204 to a display system 210 as described above.

Figure 2B:
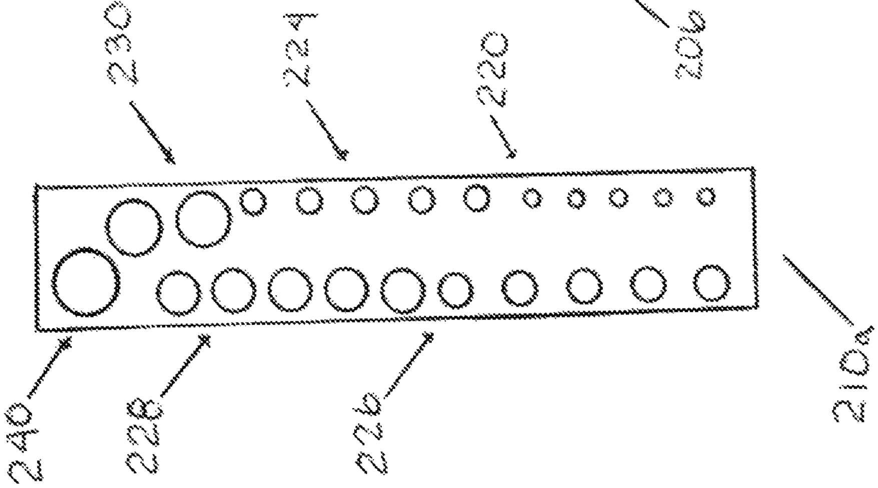
FIG. 2B shows one of the types of light displays 210*a* discussed above. The light display 210*a* is shown with six different sets 220, 224, 226, 228, 230 and 240. The six different lights are shown with different sizes to emphasize their differences.

FIG. 2B shows one of the types of light displays 210*a* discussed above. The light display 210*a* is shown with six different sets 220, 224, 226, 228, 230 and 240. The six different lights are shown with different sizes to emphasize their differences. The differences in size may represent actual differences in size, differences in intensity, color, activity (flashing, steady state, rate of flashing, etc.) and any other basis of visible differentiation. For example, the five lights in group 220 may be white or pale yellow, indicating a minimum wager (e.g., $1) at the table. Those groups gradually increasing in size may represent a red grouping for $5.00 wagers 224, pale blue lights for $25.00 wagers 226, a green grouping for $100 wagers 228, a darker sapphire blue grouping for $500 wagers 230 and a flashing optical yellow single light 240 for the maximum wager at the gaming table.

Figure 3:
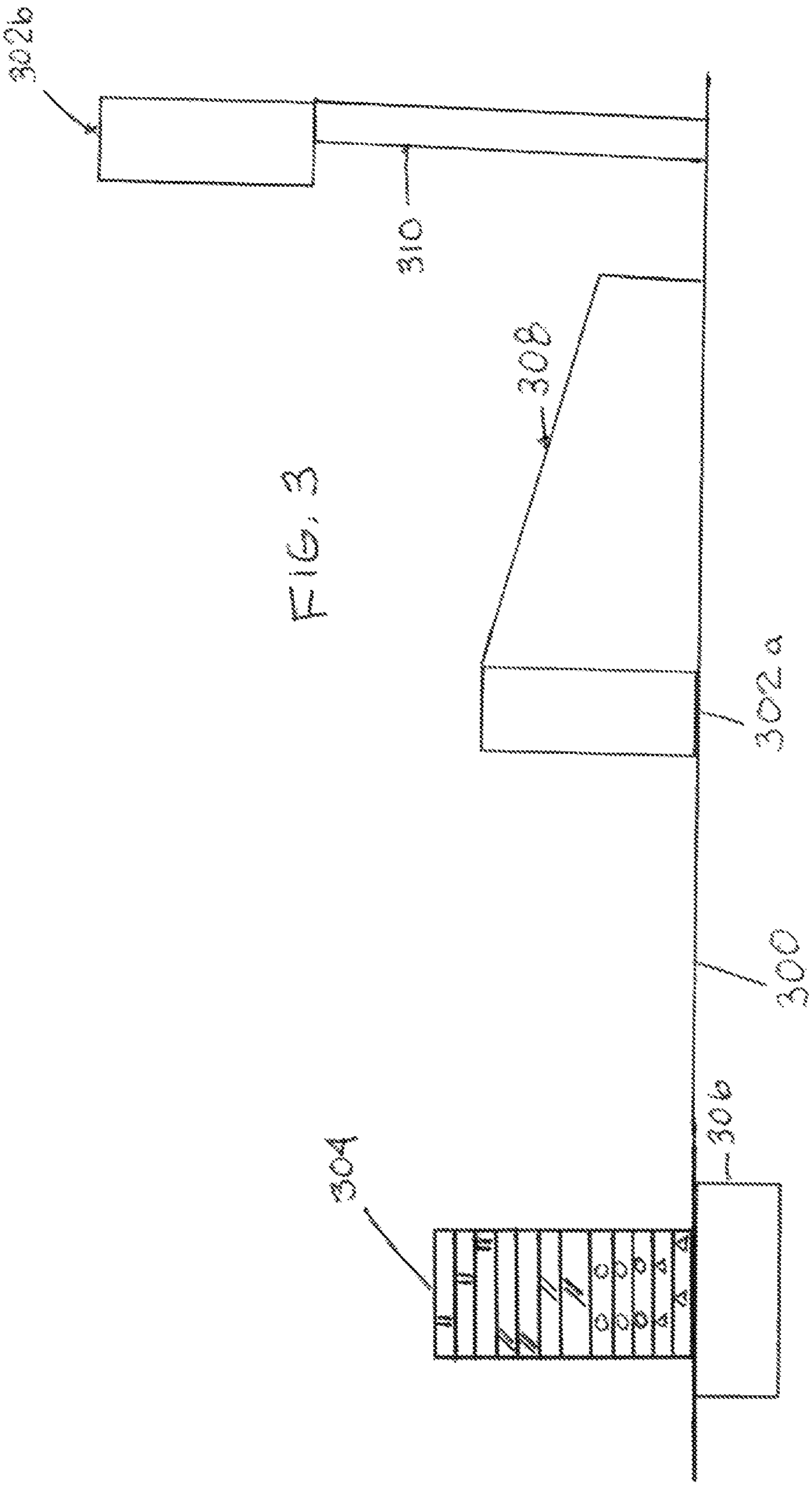
FIG. 3 is a side view of multiple possible camera positions to capture images of chips on the surface of a gaming table.

FIG. 3 is a side view of multiple possible camera positions 302*a* 302*b* to capture images of chips 304 on the surface of a gaming table 300. The cameras 302*a* 302*b* (only one needed) capture side view images of the stack of chips 304 so that individual chips can be distinguished, not only in number (which number can be enhanced or further provided by scales 306 shown under the chips 304. The camera 302*a* is shown at a forward section of a dealer chip tray 308. The alternative elevated camera 302*b* is shown supported on a post 310 to provide a more elevated perspective image of the chips 304. The stack of chips 304 is shown with individual chips having various machine-imageable markings on sides of the chips which can be distinguished by the imaging resolution capability of the cameras 302*a* and 302*b* and identified through execution of software in a processor (not shown) or performance of hardware (FPGA or ASIC, for example) to assist in either or both of identification of individual chip values and collective chip values.

The present technology incorporates numerous electronic components. The following descriptions are used to facilitate and enable practice of this aspect of the claimed invention.

The table top may preferably be made of ant structural material, but should be provided with a transparent surface over the sensors (including scales and image sensors). Preferably the table surface is made out of 1 to 5 m thick, at least visible, UV or IR radiation transparent material such as transparent polymeric material, either thermoplastic or thermoset resin. Transparent windows may be made for local areas of the surface, as by cutting out round pieces of plastic, for example 40-80 mm in diameter, such as 60 mm in diameter, and mounted in the middle, over the sensor. The sensor opening may have a diameter on the receiving portion, such as another round portion of 56 mm to go with a 60 mm window. An aluminum support piece was made and mounted below an aluminum sensor load cell to insure that chip area can handle hits and loads up to 1.0 kg.

For the line of LEDs that are used to indicate weight, numbers of chips and/or values of chips, the plastic table top piece was drilled from underneath with openings for example of 1-10 mm, for example, 5 mm under the top. LEDs were mounted just under or inside the space. The table top could be made out of plastic (clear or frosted), wood or some other composite materials (in this case holes would be made for IR light). Also stone or marble may be used because of transparency to IR, if expense is not a consideration. A manufactured and insertable LED board can also be provided.

The table top can be covered with padding (some types of foams works better than others with IR light penetration). The padding may be fabric or sheeting or foam. On the top of the table is the gaming event table top layout. Today few people use standard felt (like on billiard tables); only different materials which are easy to print on and are all transparent to IR much more then old felt.

Among the commercially available scales are preferably load cell weighing sensors and strain gauges. For example, portable 1 kg electronic scale weighing sensor load cells having an aluminum alloy casing.

Strain gauges are sensing devices used in a variety of physical test and measurement applications. They change resistance at their output terminals when stretched or compressed. Because of this characteristic, the gauges are typically bonded to the surface of a solid material and measure its minute dimensional changes when put in compression or tension. Strain gauges and strain gauge principles are often used in devices for measuring acceleration, pressure, tension, and force. Strain is a dimensionless unit, defined as a change in length per unit length. For example, if a 1 m long bar stretches to 1.000002 m, the strain is defined as 2 microstrains. Strain gauges have a characteristic gauge factor, defined as the fractional change in resistance divided by the strain. For example, 2 microstrain applied to a gauge with gauge factor of 2 produces a fractional resistance change of (2×2)10−6=4×10−6, or 4 μO. Common gauge resistance values typically range from 120 to 350 (but some devices are as low as 30 O or as high as 3 k).

Strain Measurement Configurations

Wheatstone Bridge

To make an accurate strain measurement, extremely small resistance changes must be measured. The Wheatstone bridge circuit is widely used to convert the gauge's microstrain into a voltage change that can be fed to the input of the analogue-to-digital converter (ADC). When all four resistors in the bridge are absolutely equal, the bridge is perfectly balanced and $V_{out}$=0. But when any one or more of the resistors change value by only a fractional amount, the bridge produces a significant and measurable voltage. When used with an instrument, a strain gauge replaces one or more of the resistors in the bridge, and as the strain gauge undergoes dimensional changes (because it is bonded to a test specimen), it unbalances the bridge and produces an output voltage proportional to the strain.

Full-Bridge Circuits

Although half-bridge and quarter-bridge circuits are often used, the full-bridge circuit is the optimal configuration for strain gauges. It provides the highest sensitivity and the fewest error components, and because the full bridge produces the highest output, noise is a less significant factor in the measurement. For these reasons, the full bridge is recommended when possible. A full bridge contains four strain gauges mounted on a test member. Two gauges are mounted on the top surface to measure tension and the other two are mounted on the opposite surface to measure compression when the beam is forced downward. As the member deflects, the two gauges in tension increase in resistance while the other two decreases, unbalancing the bridge and producing an output proportional to the displacement. Upward motion reverses the roles of the strain gauges.

The bridge output voltage is given by:

$$V_o=(V_{ex})(X) \quad \text{Equation 1: Full-Bridge Output Voltage}$$

Where: $V_o$=bridge output voltage, V $V_{ex}$=excitation voltage applied to the bridge, V X=relative change in resistance, BR/R The bridge nulls out potential error factors such as temperature changes because all four strain gauges have the same temperature coefficient and are located in close proximity on the specimen. The resistance of the lead wire does not affect the accuracy of the measurement as long as the input amplifier has high input impedance. For example, an amplifier with a 100-M input impedance produces negligible current flow through the measurement leads, minimizing voltage drops due to lead resistance.

Half-Bridge Circuits

When physical conditions do not allow mounting a full-bridge gauge, a half bridge might fit. Typically, two strain gauges are mounted on a test member, and two discrete resistors complete the bridge. The output voltage is:

$$V_o=V_{ex}(X/2) \quad \text{Equation 2: Half-Bridge Output Voltage}$$

Where: $V_o$=bridge output voltage, V $V_{ex}$=excitation voltage applied to the bridge, V X=relative change in resistance, BR/R For a large BR, half-bridge and quarter-bridge circuits can introduce an additional nonlinearity error. Also, the readings are not accurate when the temperature coefficients among the bridge completion resistors and strain gauges are different and the resistances do not change proportionally with temperature. Furthermore, bridge completion resistors are not usually located near the strain gauges, so temperature differences contribute additional errors. In systems with long lead wires, the bridge completion resistors should be attached close to the gauges. However, this may not always be practical due to test fixture limitations or other physical conditions.

Quarter-Bridge Circuits

A quarter-bridge circuit uses one strain gauge and three bridge completion resistors. The output voltage is:

$$V_o=V_{ex}(X/4) \quad \text{Equation 3: Quarter-Bridge Output Voltage}$$

Where: Vo=bridge output voltage, V $V_{ex}$=excitation voltage applied to the bridge, V X=relative change in resistance, BR/R This arrangement has the smallest output, so noise is a potential problem. Furthermore, all the error sources and limitations in the half-bridge circuit apply to the quarter-bridge circuit.

Excitation Source

Accurate measurements depend on a stable, regulated, and low noise excitation source voltage. A regulated source is necessary because the output voltage of a strain gauge is also proportional to the excitation voltage. Therefore, fluctuations in the excitation voltage produce inaccurate output voltages. An ideal data acquisition system provides an excitation source for each channel, independently adjustable from 1.5 to 10.5 V with a current limit of 100 mA. An excitation voltage, V, used with a strain gauge of resistance R, requires a current of I=V/R. The resistance of a Wheatstone bridge measured between any two symmetrical terminals equals the value of one of the resistance arms. For example, four 350 Ohm arms make a 350 Ohm bridge. The load current equals the excitation voltage divided by the bridge resistance; in this case, 10 V/350 O=0.029 A=29 mA.

Strain-Gauge Signal Conditioning

Most strain-gauge based transducers and load cells are assigned units of measure for weight, force, tension, pressure, torque, and deflection with a full-scale value measured in mV/V of excitation. For example, a load cell with a 10-V excitation supply and a 2-mV/V-gain factor generates an output of 20 mV at full load, whether the load cell was designed to handle 10, 100, or 1,000 lbs. The difference is in the resolution of the system. That is, the small 10-lb load cell produces 0.5 lbs/mV, and the large 1,000 lb load cell produces 50 lbs/mV. Conductors carrying such low level signals are susceptible to noise interference and should be shielded. Low-pass filters, differential voltage measurements, and signal averaging are also effective techniques for suppressing noise interference. Furthermore, instrumentation amplifiers usually condition the extremely low strain-gauge signals before feeding them to ADCs. For example, a 10-V full-scale input provides 156 μV of resolution for a 16-bit ADC. The instrumentation amplifier gain should be adjusted to provide the full-scale output of the strain gauge or load cell over the entire range of the ADC. Force and pressure transducers typically generate an offset output signal when no external force is applied. Instrumentation amplifiers usually contain a control to adjust this offset to zero and let the load cell cover the full range of the ADC. Most amplifiers also provide adjustable excitation and gain.

Common Mode Rejection Ratio

A high common mode rejection ratio (CMRR) is essential for strain-gauge amplifiers. A strain-gauge signal in a Wheatstone bridge is superimposed on a common-mode voltage equal to half the excitation voltage. CMRR is a measure of how well the amplifier rejects common-mode voltages. For example, consider a 10-V excitation supply ($V_{max}$=5 V) for a strain gauge with 2 mV/V (Vs=20 mV) at full scale and an amplifier with a CMRR of 90 dB. The amplifier can introduce 0.158 mV of error, corresponding to about 0.80% full scale, which may not be acceptable:

By comparison, a CMRR of 115 dB introduces only 9 mV of error, which corresponds to only 0.04% of full scale.

Strain gauge signal-conditioning modules usually provide a regulated excitation source with optional Kelvin excitation. Onboard bridge-completion resistors may be connected for quarter and half-bridge strain gauges. Instrumentation amplifiers provide input and scaling gain adjustments, and an offset adjustment nulls large quiescent loads. This lets input signals use the full range of the data acquisition system, and the measurements cover the full resolution of the ADC. Some strain-gauge signal conditioners provide fixed gain, offset, and excitation settings, but fixed settings do not take advantage of the maximum dynamic range of the ADC. It decreases the actual available resolution of the measurement. For example, many generic strain gauge-signal conditioner modules can be set to a fixed 3-mV/V rating. At 10V, the excitation, offset, and gain trimming are all fixed and no adjustments can be made. An excitation adjustment lets users set the excitation voltage to the maximum allowed by the manufacturer, which maximizes the bridge's output. Also, the offset adjustment lets users zero the output offset produced by either a small bridge imbalance or a quiescent deformation of the mechanical member that it is mounted upon. And the gain adjustment lets users set a gain that provides a full-scale output under maximum load, which optimizes the dynamic range of the ADC.

Calibration

The signal-conditioning module also typically provides a shunt calibration feature. See FIG. 7. It lets users switch their own shunt resistors into either one of the two lower legs of the bridge under software control. For example, a shunt resistor can be calculated to simulate a full load. Applying a shunt resistor is a convenient way to simulate an unbalance without having to apply a physical load. For any balanced bridge, a specific resistor can be connected in parallel with one of the four bridge elements to obtain a predictable unbalance and output voltage.

For example, a 350 O, 2-mV/V strain gauge delivers full output when one leg drops by 0.8% to 347.2 O. A 43.75-kO resistor shunted across one or the other lower bridge elements swings the output to full positive or full negative.

An appropriate equation for the shunt calibration resistor value is:

Many products include calibration software with a Windows-based program that provides several calibration methods, online instruction, and a diagnostic screen for testing the calibrated system.

Transducers and Load Cells

Strain gauges are commercially available in prefabricated modules such as load cells that measure force, tension, compression, and torque. Load cells typically use a full-bridge configuration and contain four leads for bridge excitation and measurement. The manufacturers provide calibration and accuracy information.

Strain Diaphragm Pressure Gauges

A strained-diaphragm pressure gauge consists of two or four strain gauges mounted on a thin diaphragm. The gauges are wired in a Wheatstone bridge circuit, including bridge completion resistors when needed, so the pressure gauge is electrically equivalent to a load cell. The output voltage is specified in mV/V of excitation for a full-scale pressure differential across the diaphragm. When one side of the diaphragm (called the reference pressure side) is open to the ambient atmosphere, the gauge compares the inlet pressure to the ambient pressure, which is about 14.7 psi at sea level. When the gauge measures ambient pressure, the reference chamber must be sealed with either a vacuum reference (near zero psi) or the sea-level reference. Temperature variations can affect the accuracy of strained diaphragm pressure gauges. A pressure gauge with a sealed nonzero reference pressure exhibits temperature variations consistent with the ideal gas law. For example, a 5° C. change in ambient temperature near normal room temp (25° C.) produces an error of 1.7% in the pressure measurement. Temperature variations can also affect the performance of the strain gauges themselves. Transducers must contain temperature compensation circuits to maintain accurate pressure measurements in environments with widely varying temperatures. All strained-diaphragm pressure gauges require a regulated excitation source. Some gauges contain internal regulators, so users can connect an unregulated voltage from a power supply. Some strained-diaphragm pressure gauges also employ internal signal conditioning, which amplifies the mV signal output of the Wheatstone bridge to a full-scale voltage from 5 to 10 V. Gauges of this type have low-impedance outputs. In contrast, other pressure gauges have no internal signal conditioning so their output impedance equals the Wheatstone bridge resistance (several commercially available formats for semiconductor types), and their full-scale output is in mV.

A Commercially available data acquisition model includes a USB-6002 Low-Cost Multifunction DAQ for Basic, Quality Measurements. This DAQ provides:

8 analog inputs, 50 kS/s, 16-bit resolution 13 digital I/O lines; one 32-bit counter Lightweight and bus powered for easy portability Easily connect sensors and signals with screw-terminal connectivity OEM version available Compatible with ANSI C, C#.NET, VB .NET, LabVIEW, LabWindows™/CVI, and Measurement Studio The low-cost DAQ family is ideal for basic applications such as simple data logging, portable measurements, and academic lab experiments. This family consists of four products with a range of functionality, including up to 16 bits of resolution for analog input, hardware-timed analog output capabilities, up to 13 digital I/O lines, and a basic counter for edge counting.

The USB-6002 provides eight analog input channels with 16 bits of resolution and a 50 kS/s sample rate, 13 digital I/O lines, one basic counter for edge counting, and two analog output channels. It features a lightweight mechanical enclosure and is USB bus powered for portability.

The system may be generally described, without limitation of the generic scope of the invention or the use of alternative embodiments as a system comprising: a table surface, an electronic scale at a wagering position to weigh gaming chips; a camera, preferably a digital or analog camera positioned to capture images of the side (edges) and distinguish numbers of chips and any information on the side of the chips; preferably a count/value display system is embedded in the table top after determination through camera data and/or weight the number and value of the chips on the scale; and a processor to receive and provide final data/content on sensed data from the scale and camera.

The chip scale is preferably enabled with an electronic scale weighing sensor (as described herein), a load cell sensor amplifier (preferably a full bridge strain gauge transducer, a data acquisition module for the sensed data (measurements), the display board (such as an LED board), the imaging functionality (e.g., LED lights), windows or transparency on the table top through which imaging radiation may be displayed or the sensors (e.g., scales) are positioned (with elastomeric or resilient foam supports between the scales and the windows, supports to stop weight overload on the windows and scales, camera modules may be selected from analog or digital cameras (compact cameras, from 0.5 to 5 cm, with a minimum of 500 lines resolution (preferably at least 700, at least 900 and at least 1000 lines, color preferred but black-and-white can be functional), a smart camera (with intelligence or processing data conversion capability therein with at least 600×400 pixels, 752×480 pixels, or preferably 1328×1048 pixels and preferably color capability, and a color or black-and-white camera with 752×480 pixels and four distinct sensors. Equivalent camera capability is also available.

One skilled in the electronic table gaming arts would be aware after reading this application that a generic concept has been enabled and that variations, alterations and alternatives may be used, with the modified technology remaining within the scope of the intent and generic invention claimed herein.

What is claimed:

1. A table system for assisting in determination of wagering events comprising:

a gaming surface;

at least one player position on the gaming surface;

at least one area designated at the at least one player position for placement of wagers in the form of chips;

a scale positioned beneath the at least one area configured to provide electrical signals indicating weight placed in the at least one designated area;

a processor configured to receive the electrical signals and execute code to identify numbers of chips placed in the at least one designated area; the processor configured to provide signals indicating the identified number of chips to a display on the gaming table surface at the player position; and the display configured to provide a visual indication of the number of chips or the value of chips;

the system further comprising an electronic camera having an image capture area that include the at least one designated area, wherein the electronic camera is configured to send image data captured from the at least one designated area to the processor, and wherein the camera is configured to send captured image data differentiating values of individual chips in the designated area; and wherein the display comprises i) a light display indicating numbers of chips by length, or area of illumination of the light display or ii) a light display indicating numbers of chips by display of alphanumerics indicating the number or value of chips.

2. The table system of claim 1 wherein the display comprises i) a light display indicating numbers of chips by length, or area of illumination of the light display or ii) a light display indicating numbers of chips by display of alphanumerics indicating the number or value of chips.

3. The table system of claim 2 wherein the display comprises i) a light display indicating numbers of chips by length, or area of illumination of the light display or ii) a light display indicating numbers of chips by display of alphanumerics indicating the number or value of chips.

4. The table system of claim 3 wherein the camera is oriented towards the designated area at an angle between parallel to the gaming surface and downward thirty degrees towards the gaining surface.

5. The table system of claim 1 wherein the camera is oriented towards the designated area at an angle between parallel to the gaining surface and downward thirty degrees towards the gaming surface.

6. The table system of claim 2 wherein the camera is oriented towards the designated area at an angle between parallel to the gaining surface and downward thirty degrees towards the gaming surface.

7. The table system of claim 4 wherein the camera is sensitive to radiation including at least some radiation outside the visible spectrum and a source of radiation outside the visible spectrum to which the camera is sensitive illuminates the designated area.

8. The table system of claim 5 wherein the camera is sensitive to radiation including at least some radiation outside the visible spectrum and a source of radiation outside the visible spectrum to which the camera is sensitive illuminates the designated area.

9. The table system of claim 6 wherein the camera is sensitive to radiation including at least some radiation outside the visible spectrum and a source of radiation outside the visible spectrum to which the camera is sensitive illuminates the designated area.

10. A table system for assisting in determination of wagering events comprising:

a gaming surface;

at least one player position on the gaming surface;

at least one area designated at the at least one player position for placement of wagers in the form of chips;

a scale positioned beneath the at least one area configured to provide electrical signals indicating weight placed in the at least one designated area;

a processor configured to receive the electrical signals and execute code to identify numbers of chips placed in the at least one designated area;

an electronic camera having an image capture area that include the at least one designated area and receive and transmit image data received from the at least one designated area regarding wagering value of individual chips within the at least one designated area;

the processor configured to provide signals indicating at least one of total number of the chips placed in the at least one designated area or the value of the chips placed in the at least one designated area; and a display system on the gaming table displaying at least one of total number of the chips placed in the at least one designated area or the value of the chips placed in the at least one designated area, wherein the display system is fixed in or under the table surface and the display indicia do not include alphanumeric symbols, with value of chips in the designated area indicated by numbers of lights or areas of lights.

11. The table system of claim 10 wherein numbers of lights indicate exact numbers of chips wagered.

12. The table system of claim 11 wherein different colors of lights indicate different values of chips in the designated area.

* * * * *